United States Patent [19]
Spencer et al.

[11] 3,731,221
[45] May 1, 1973

[54] TUNABLE OPTICAL CAVITY FOR CHEMICAL LASER

[75] Inventors: Donald J. Spencer, Torrance; Donald A. Durran, Manhattan Beach; Henry A. Bixler, Hawthorne, all of Calif.

[73] Assignee: The United States of America as represented by the Secretary of the Air Force

[22] Filed: Aug. 10, 1971

[21] Appl. No.: 170,505

[52] U.S. Cl. ................................................. 331/94.5
[51] Int. Cl. ................................................. H01s 3/08
[58] Field of Search ................. 331/94.5; 330/4.3

[56] References Cited

UNITED STATES PATENTS 3,478,608  11/1969  Met ............................ 331/94.5
3,560,876  2/1971  Airey .......................... 331/94.5
3,466,566  9/1969  Patel ........................... 331/94.5

Primary Examiner—Ronald L. Wibert
Assistant Examiner—R. J. Webster
Attorney—Harry A. Herbert, Jr. et al.

[57] ABSTRACT

A tunable optical cavity for use with a chemical laser of the type utilizing a supersonic jet flow of a vibrationally excited gas as a lasing medium and further characterized by having a variable optically active dimension running transverse to the longitudinal axis of its optically active region. The tunable optical cavity is defined by a first laser mirror fixedly positioned on one side of the gas flow and characterized by having an optically flat mirror surface oriented parallel to the direction of the gas flow and a second laser mirror rotatably positioned on the other side of the gas flow and characterized by having a spherical shaped mirror surface oppositely disposed from the flat mirror surface.

2 Claims, 6 Drawing Figures

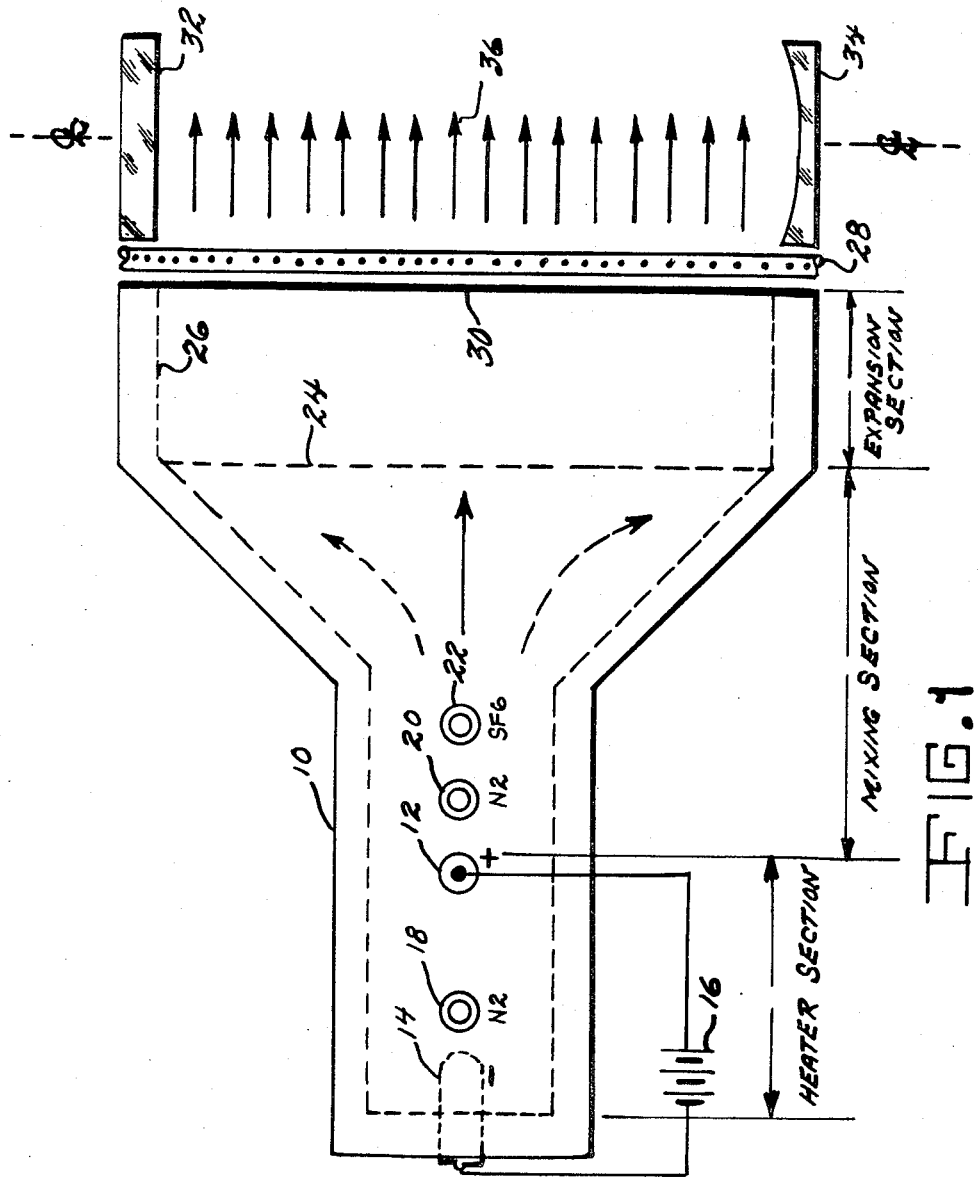

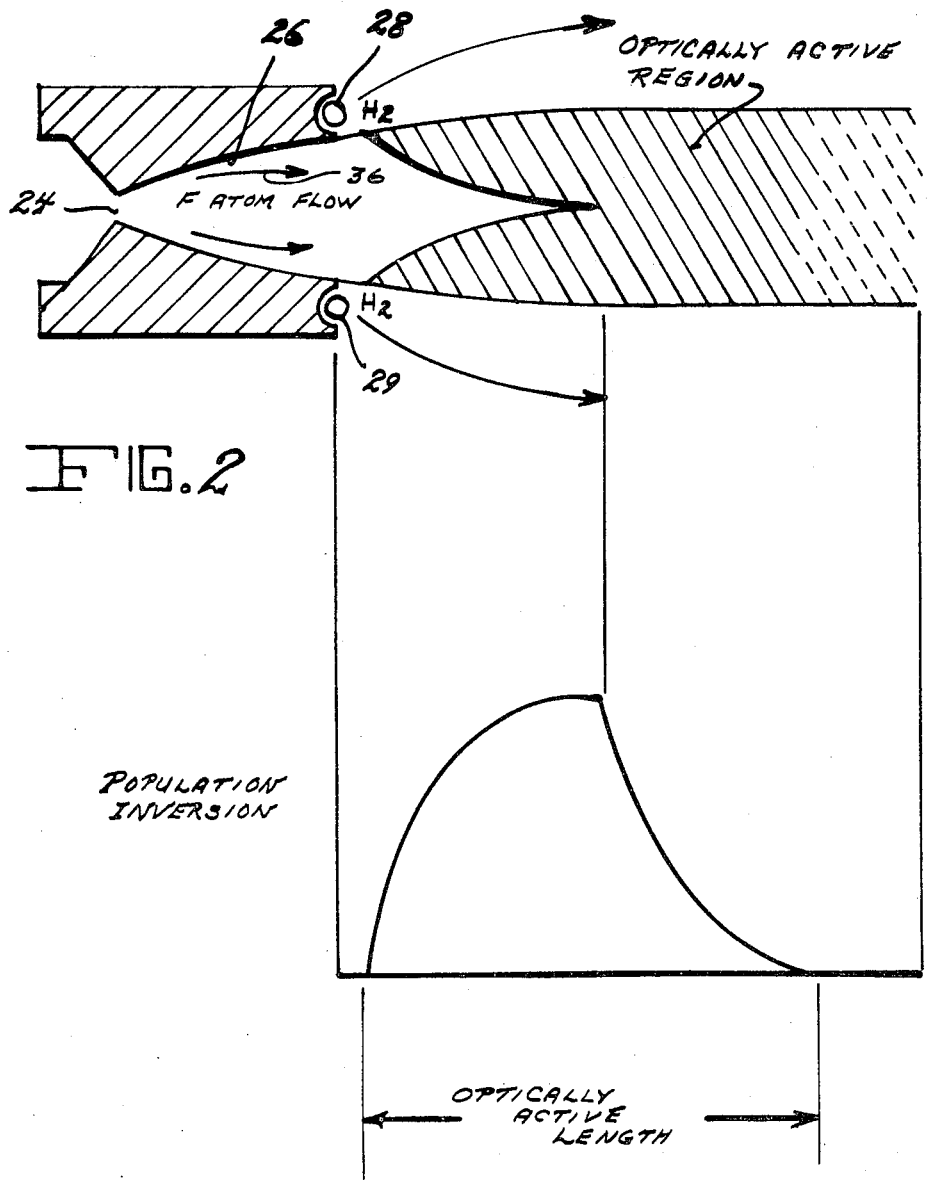

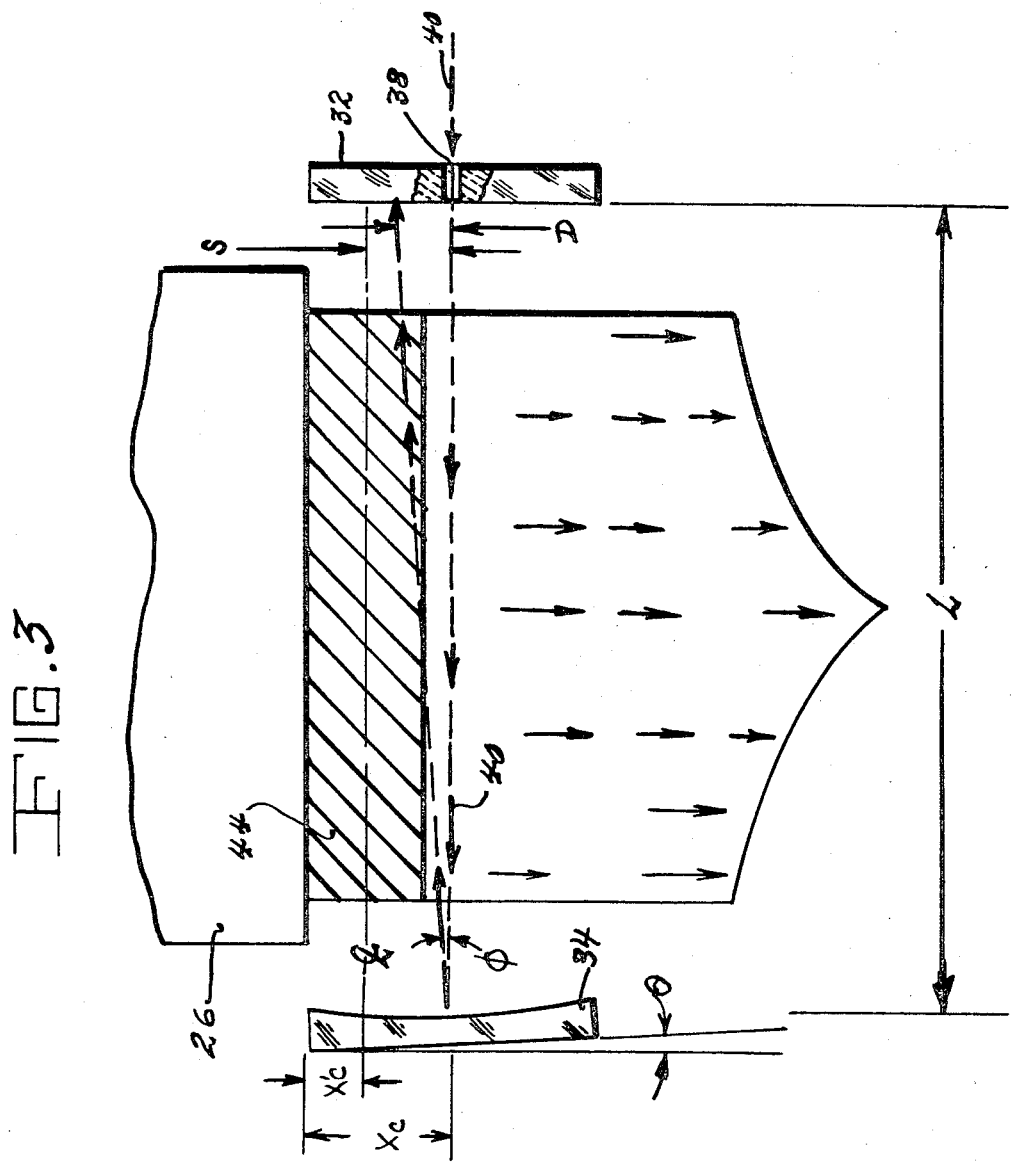

TUNABLE OPTICAL CAVITY FOR CHEMICAL LASER

CROSS REFERENCE TO RELATED APPLICATION

A system for generating a continuous wave (CW) chemically pumped lasing action through the use of a gaseous material is disclosed in a co-pending U.S. Pat. application of the same Assignee entitled "Continuous-Wave Chemical Laser," filed on Sept. 21, 1970 as U.S. Pat. application No. 73,820 now U.S. Pat. No. 3,688,215.

BACKGROUND OF THE INVENTION

This invention relates to continuous wave chemical lasers of the type that generate a lasing action by directing a supersonic jet flow of gaseous reactants into the optical cavity of a laser chamber. More particularly, this invention concerns itself with a tunable optical cavity for use with chemical lasers which have a variable optically active dimension transverse to the axes of their optical cavities.

Laser systems that utilize a gaseous medium for the generation and amplification of coherent electromagnetic energy in the optical frequency range are presently available in the art. For example, carbon dioxide, nitrous oxide, mixtures of carbon dioxide and helium and mixtures of carbon dioxide, helium and nitrogen are known gaseous mediums for use in laser systems in which the requisite population inversion for lasing action is accomplished by electronic discharge. Other laser systems utilize gaseous reactants in which the population inversion is accomplished through a chemical reaction. An example of a chemical reaction laser system is one in which a first reactant gas, such as hydrogen is diffused into a supersonic jet flow containing a second reactant gas, such as fluorine. The two reactant materials react chemically to provide a sustained high speed flow of a vibrationally excited gaseous product with the requisite population inversion and life-time needed for lasing. The lasing action takes place in an optical cavity whose axis is transverse to the direction of the high speed gaseous flow. A more detailed description of the chemical reaction referred to above can be found in U.S. Pat. application No. 73,820, filed Sept. 21, 1970 now U.S. Pat. No. 3,688,215.

Chemical lasers of the type described above, utilize an optical cavity lasing chamber that is defined by two laser mirrors oppositely disposed on each side of the high speed gas flow. They are positioned downstream from the region where diffusion or mixing of the gaseous reactants take place. Optical cavities of this type have a variable length optically active downstream dimension transverse to the axis of the optical cavity. In other words, the optically active distance along the jet flow axis of the laser chamber is highly variable with both the extent of the inversion region and the axial gain distribution dependent upon flow parameters, such as reactant and diluent concentration, gas temperature and pressure, flow velocity and nozzle configuration. In order to diagnose the optically active region and achieve optimum power coupling under parametric changes, it is essential to have a capability to rapidly change the extent of the optical cavity downstream dimension. If the optically active length in the jet extends beyond the cavity axial mode length ($2X_c$ in FIG. 3), the laser operating power will be less than optimum. Thus, the mirror length must exceed the expected active jet length. However, if the cavity axial mode length extends beyond the optically active length in the jet, the power will also be less than optimum since the flowing gas downstream of the lasing mode pattern absorbs in this domain. The net effect of downstream absorption is to shrink the mode length symmetrically about the cavity centerline. Optimum power tuning results when the cavity length and lasing gas active length coincide.

Prior to the present invention, the tuning of an optical cavity had to be performed for each axial cavity centerline position. This entailed repositioning an alignment laser (He Ne) and the two cavity mirrors for each alignment. However, these activities were both time-consuming and tedious and seriously affected the efficiency and optimum utilization of laser systems of the type referred to above.

With the present invention, however, there has been developed a technique which accomplishes optical cavity tuning in a simple and highly efficient manner. This is accomplished by employing a first cavity mirror whose optically flat mirror surface is positioned on one side of the jet flow and oriented normal to the nozzle exit plane and a second cavity mirror whose spherically shaped mirror surface is mounted opposite from the flat mirror on the other side of the jet stream.

SUMMARY OF THE INVENTION

In accordance with this invention, the tuning of an optical cavity system for use with laser systems that employ a supersonic jet flow of gaseous reactants is accomplished by a technique which employs a pair of oppositely disposed laser mirrors in the optical cavity chamber of the laser system. The laser mirrors each comprise a specific configuration with one mirror comprising an optically flat surface which is oriented normal to the gas nozzle exit plane. The second cavity mirror is rotatable, spherical in shape and mounted opposite the flat mirror on the other side of the jet stream. This second mirror may have a radius of curvature defined as $\infty > R > 2L$ where $L =$ mirror separation, i.e., cavities may range from confocal through coplanar. The coplanar configuration is a special case, however, consisting of an infinitude of parallel optical axes and is employed only for limited diagnostic work. Except for this cavity condition, only a single optical axis normal to both mirrors exists.

The use of a mirror system of the type described herein provides certain advantages. First, the optical cavity requires but a single alignment with an alignment laser for one axial position. Thereafter, the optical cavity axis may be translated transversely by simple mirror rotation. Second, the active cavity region may be made equal to the variable length optically active region extending from the nozzle exit plane to a distance downstream equal to twice the distance from the nozzle to the cavity centerline. Unused portions of the mirrors do not interfere with the active modes in the cavity and need not be masked. The tuning of the optical cavity requires but one single alignment with an He Ne alignment laser. Thereafter alignment of the cavity is accomplished by simple rotation of a single mirror.

Accordingly, the primary object of this invention is to provide a simple and efficient technique for tuning the optical cavity of a gaseous chemical laser.

Another object of this invention is to provide a laser device that utilizes a pair of specially configured laser mirrors in its optical cavity chamber.

Still another object of this invention is to provide a tunable optical cavity for use with lasers having a variable optically active distance running transverse to the axis of the optical cavity.

The above and still other objects and advantages of the present invention will become more readily apparent upon consideration of the following detailed description thereof when taken in conjunction with the accompanying drawings.

DESCRIPTION OF THE DRAWINGS

FIG. 1 represents a view in schematic form of a chemical laser suitable for use with the optical cavity tuning system of this invention;

FIG. 2 represents a view in schematic form of the optically active region of the chemical laser shown in FIG. 1;

FIG. 3 represents a view in schematic form of the optical cavity tuning system of this invention.

DESCRIPTION OF THE PREFERRED EMBODIMENT

Figure 4A:
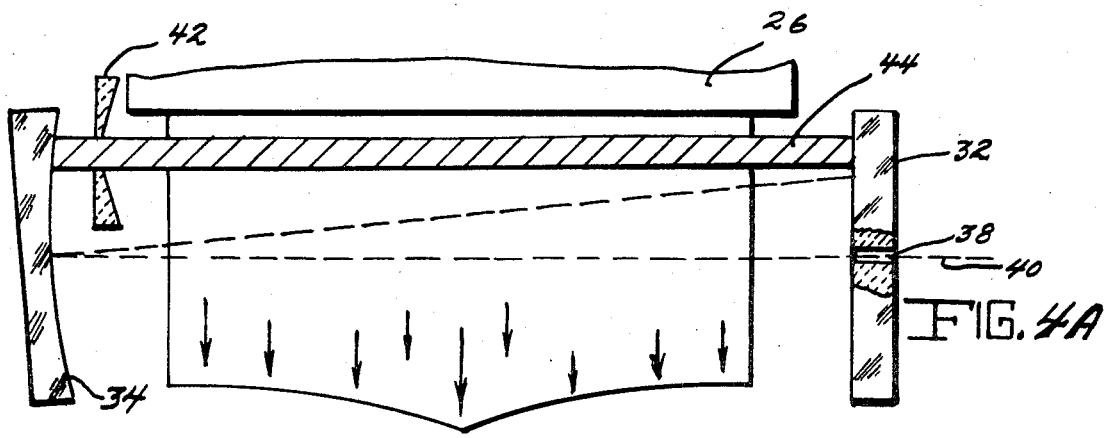
FIGS. 4A, 4B and 4C represent still other views in schematic form of the optical cavity tuning system of this invention.

The present invention provides a tunable optical cavity to be used with lasers having a variable optically active dimension transverse to the optical cavity axis. The problem of laser cavity tuning in a variable length optically active region exists only with lasers which employ supersonic jet flows of reactant gases. However, the principles involved in the tunable cavity of this invention apply equally well to other laser devices of similar design. A chemical laser utilizing a gaseous jet flow and of the type referred to above is shown in FIG. 1. This laser is more fully described in co-pending U.S. Pat. application 73,820, filed Sept. 21, 1970.

Now with reference to FIG. 1 in the drawings, wherein like elements in the several views are represented by like reference characters, there is shown a schematic illustration of a continuous-wave chemical laser suitable for use with this invention. The laser comprises a chamber 10 which contains an arc heater at one end having a pair of positive electrodes, one of which is shown as 12 and one of which is not shown. A negative electrode 14 is connected to a suitable power source 16. Gas inlets 18 and 20 are provided for the introduction of an inert diluent gas, while gas inlet 22 is provided for the introduction of a fluorine compound. The inert gas is heated to a desired temperature in that portion of the tube designated as the heater section. Disassociation of the fluorine compound to atomic fluorine takes place largely within that portion of the chamber 10 designated as the mixing section. The dilute fluorine atomic flow is then directed through a two-dimensional supersonic nozzle, 24 and 26, causing the gaseous mixture to expand as a supersonic jet of flowing gas. A pair of perforated tubes 28 and 29 are positioned on each side of the nozzle exit 30 across the width of the jet stream. A reactant gas is injected through the perforated tubes into the flowing inert gas-fluorine atom containing jet stream. This provides an atmosphere adjacent to the jet stream boundaries that is rich in reactant gas. The reactant gas diffuses completely into the jet stream mixture and reacts chemically with the fluorine atoms to produce a vibrationally excited hydrogen fluoride gas 36. The excited gas 36 then flows into an optical laser cavity defined by laser mirrors 32 and 34 where it lases. The laser cavity is mounted transverse to the jet flow with the cavity centerline located about 1 to 5 inches downstream of the nozzle exit plane 30. The optically active distance in the cavity runs along the jet axis and is highly variable, with both the extent of the inversion region and the axial gain distribution dependent upon flow parameters, such as reactant and diluent concentration, gas temperature and pressure, flow velocity and nozzle geometry. In order to properly diagnose the optically active region 44 and achieve optimum power coupling under parametric changes, a means must be provided for changing the extent of the optical cavity downstream dimension.

If the optically active length in the jet extends beyond the cavity axial mode length ($2X_c$ in FIG. 3), the laser operating power will be less than optimum. Thus, the mirror length must exceed the expected active jet length. However, if the cavity axial mode length extends beyond the optically active length in the jet, the power will also be less than optimum since the flowing gas downstream of the lasing mode pattern absorbs in this domain. The net effect of downstream absorption is to shrink the mode length symmetrically about the cavity centerline. Optimum power tuning results when the cavity length and lasing gas active length coincide.

Prior to the implementation of the tuning method described herein, an optical alignment had to be performed for each axial cavity centerline position. This entailed repositioning of an alignment laser (He Ne) and the two cavity mirrors for each alignment. These activities were time-consuming. With this invention, only one single alignment with an He Ne alignment laser is required. Thereafter realignment is accomplished by simple rotation of a single mirror. This is accomplished by employing an optically flat mirror whose mirror surface is oriented normal to the gas nozzle exit plane. The second cavity mirror is spherical and is mounted opposite the flat mirror on the other side of the jet. This mirror may have a radius of curvature $\infty > R > 2L$ where $L =$ mirror separation, i.e., cavities may range from confocal through coplanar. The coplanar configuration is a special case, however, consisting of an infinitude of parallel optical axes and is employed only for limited diagnostic work. Except for this cavity condition, only a single optical axis normal to both mirrors exists.

In operation, the cavity is tuned for one axial position of the optical axis in the centerplane of the jet. Thereafter, rotation of the spherical mirror about an axis normal to both the jet flow axis and the cavity axis produces an axial translation of the optical cavity centerline relative to the gas nozzle exit plane. The cavity centerline placement may range from the nozzle exit plane to the mirror length downstream ($2X_c$ in FIG. 3).

Figure 4B:
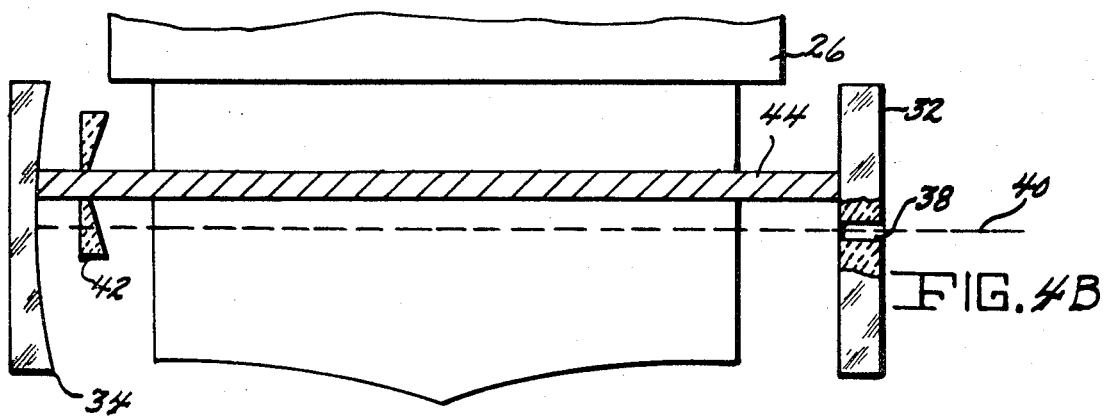
Figure 4C:
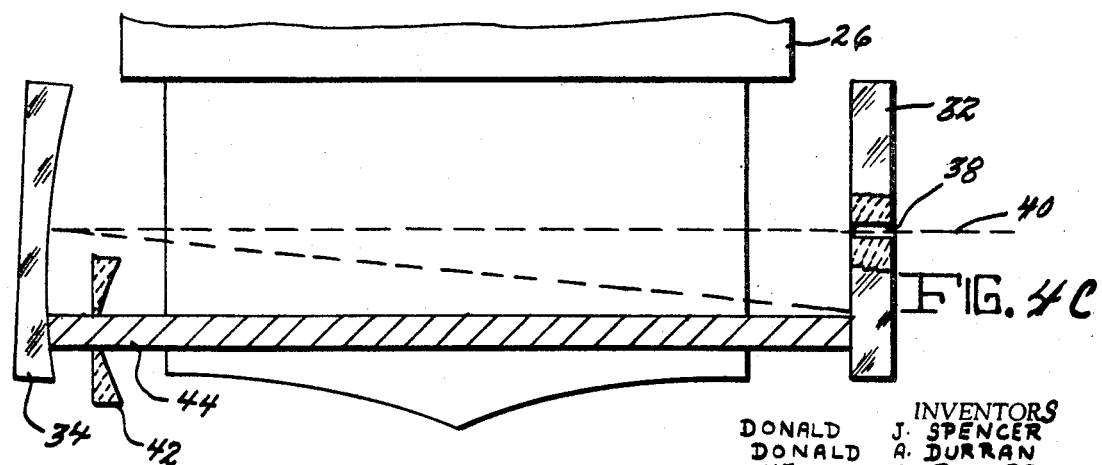

The active laser modes are always symmetrically arrayed about the cavity centerline. Thus, the active cavity axial dimension is determined by the alignment and extends equidistant up and downstream of the cavity centerline to the first limiting aperture. Under normal operation, the gas nozzle constitutes the upstream limiting aperture and the cavity region extends downstream from there a distance $2X'_c$ where $0 \leq 2X'_c \leq 2X_c$. Unused portions of the mirrors do not interfere with the modes in the cavity and need not be masked off. This cavity configuration, when coupled with a movable aperture 42 as shown in FIGS. 4A, 4B and 4C, may also be used for making axial power distribution surveys of the jet similar to the population inversion survey shown in FIG. 2. In order to accomplish this, it is necessary for the aperture to limit the laser cavity dimension along the jet to a small fraction of the total optically active length. The aperture is then inserted in the cavity region at the desired axial position, $X'_c$, the cavity being tuned for the same $X'_c$ value as outlined below. The aperture surfaces must not set up parasitic cavities with the trans-jet mirror. In addition, the aperture plate should be water-cooled and may be motor translated for convenience in rapid positioning. This allows data acquisition for an entire transverse during a single continuous test run. The cavity and aperture axes must be coincident for each data point. The position of the axes may be calculated and measured. However, coincidence of the axes may also be assured by tuning at each axial position for maximum laser power. Thus, the aperture may be shifted in discrete increments along the length of the traverse and the cavity moved thereafter to optimize power output at each point to map out the inversion region. FIG. 4 shows an illustration of the technique described above.

The high heat flux levels associated with high power chemical lasers requires the use of water-cooled metal mirrors. The two mirrors may be used simply as radiation calorimeters with no external coupling for diagnostic studies. In addition, the flat may be perforated to provide hole or slot coupling outside the cavity.

FIG. 3 illustrates how the alignment of the optical cavity may be accomplished.

A small hole (0.040 dia) is drilled through the center of the flat mirror 32 which allows entrance of a beam of light 40 into the optical cavity from a He Ne alignment laser (not shown). The spherical mirror is then adjusted to reflect the incident beam 40 back along its entrance path. This completes the initial alignment of the spherical mirror. Diffraction of the beam 40 results in some light striking an annular area surrounding the entrance hole as the beam exits the cavity. This annular light pattern, in turn, reflects back onto the spherical mirror 34 where it may be seen. Fine tuning of the flat mirror 32 is completed by centering this reflected beam about its incident beam. The flat mirror 32 need not be tunable if the rigid mirror mounting assures alignment normal to the nozzle exit plane. In this case, however, the alignment laser must be moved to affect the alignment of the beam to the mirror. In practice many reflection spots are observed in each mirror prior to alignment and initial alignment is complete when all spots coalesce to one at the center of each mirror. This establishes the cavity centerline a distance $X_c$ downstream from the nozzle exit plane.

Rotation of the spherical mirror 34, so as to move its reflected beam upstream, now shifts the location of the optical centerline of the cavity upstream but always parallel to the initial crossjet alignment. Displacement of the optical centerline is related to mirror rotation as follows:

Let $R$ = Radius of curvature of spherical mirror
$\theta$ = Angle of mirror rotation
$S$ = Displacement of cavity axis
Then $S = R \sin \theta$ (1)

The spherical mirror axial movement micrometer dial, not shown, may be calibrated to give the value of S directly; or the calibration may be obtained from a measurement of the distance between the first reflected spot on the flat and the entrance hole. This displacement is directly related to the position of the cavity centerline.

Let $L$ = Mirror separation
$\phi$ = Angle of beam rotation
$D$ = Displacement of beam (i.e., distance between entrance hole and nearest displaced spot)
Then $D = L \tan \phi$.
But $\phi = 2\theta$, therefore
$D = L \tan 2\theta$ (2)

Expressing $S$ in terms of $D$ we obtain $$S = RD/2L (\cos 2\theta)/(\cos \theta)$$ (3)

For small values of $\theta$ this reduces to $$S = RD/2L$$ (4)

For a confocal system $R = 2L$, and this further simplifies to $$S = D$$ (5)

For all larger radii of curvature the cavity axis displacement is always greater than the beam displacement. D may therefore always be measured on the flat mirror surface. The downstream displacement of the optical cavity centerline is then given by $X'_c = X_c - S$.

The cavity configuration of this invention was fabricated and tested using the laser system illustrated in FIG. 1. The cavity performed as outlined above. Subsequent tests confirmed its extreme usefulness in optimizing power under conditions of varying optically active jet length. For example, test runs in which $O_2$ was added to the upstream flow produced a laser power increase at a fixed axial cavity centerline position ($X = 0.7$). Translation of the cavity centerline to the $X = 1.0$ position produced a further increase in power indicating an extension of the optically active jet length due to $O_2$ addition.

While the invention has been described with particularity in reference to specific embodiments thereof, it is to be understood that the disclosure of the present invention is for the purpose of illustration only and is not intended to limit the invention in any way, the scope of which is defined by the appended claims.

What is claimed is:

1. In a gaseous chemical laser characterized by having a variable optically active dimension running transverse to the axis of its optically active region comprising:

means for supplying a gaseous lasing medium for forming an excited state specie which emits radiation upon relaxation from the excited state;

means for forming a supersonic jet flow of said gaseous medium and for directing said gaseous medium into an optically active region for extraction of laser radiation from the excited specie;

said optically active region located transverse to the jet flow of said gas with its centerline positioned downstream from said forming and directing means;

the improvement which comprises, in said optically active region, an optical resonant cavity comprised of a first laser mirror fixedly positioned on one side of said jet flow and characterized by having an optically flat mirror surface oriented parallel to the direction of said jet flow and a second laser mirror rotatably positioned on the other side of the jet flow and characterized by having an optically spherical shaped mirror surface oppositely disposed from the flat mirror surface, said second mirror being rotatably positioned about an axis normal to both the jet flow axis and the optical cavity axis for allowing an axial translation of the optical cavity centerline relative to the exit plane of the forming and directing means.

2. In a chemical laser in accordance with claim 1 wherein the radius of curvature of the said spherical shaped mirror surface is $$\infty > R \geq 2L$$

where $L$ = mirror separation.

* * * * *